United States Patent
Chang et al.

(10) Patent No.: US 9,153,816 B2
(45) Date of Patent: Oct. 6, 2015

(54) CATHODE MIX FOR SECONDARY BATTERY AND SECONDARY BATTERY COMPRISING THE SAME

(71) Applicant: LG CHEM, LTD., Seoul (KR)

(72) Inventors: Sung-Kyun Chang, Yuseong-gu (KR); Seung-tae Hong, Yuseong-gu (KR)

(73) Assignee: LG CHEM, LTD., Seoul (KR)

( * ) Notice: Subject to any disclaimer, the term of this patent is extended or adjusted under 35 U.S.C. 154(b) by 45 days.

(21) Appl. No.: 13/943,139

(22) Filed: Jul. 16, 2013

(65) Prior Publication Data

US 2013/0302672 A1 Nov. 14, 2013

Related U.S. Application Data

(63) Continuation of application No. PCT/KR2012/001089, filed on Feb. 14, 2012.

(30) Foreign Application Priority Data

Feb. 15, 2011 (KR) .................. 10-2011-0013074

(51) Int. Cl.
| | |
|---|---|
| *H01M 4/13* | (2010.01) |
| *H01M 4/58* | (2010.01) |
| *H01M 4/00* | (2006.01) |
| *H01M 4/50* | (2010.01) |
| *H01M 4/131* | (2010.01) |
| *H01M 4/62* | (2006.01) |
| *H01M 10/052* | (2010.01) |
| *H01M 4/36* | (2006.01) |
| *H01M 2/10* | (2006.01) |
| *H01M 4/02* | (2006.01) |

(52) U.S. Cl.
CPC .............. *H01M 4/131* (2013.01); *H01M 4/366* (2013.01); *H01M 4/5825* (2013.01); *H01M 4/625* (2013.01); *H01M 10/052* (2013.01); *H01M 2/1077* (2013.01); *H01M 2004/021* (2013.01); *H01M 2220/20* (2013.01); *Y02E 60/122* (2013.01); *Y02T 10/7011* (2013.01)

(58) Field of Classification Search
USPC ................ 429/218.1, 223, 224, 231.6, 231.9, 429/231.95, 212
IPC ............................ H01M 4/48,4/505, 4/52, 4/525
See application file for complete search history.

(56) References Cited

U.S. PATENT DOCUMENTS

| | | | |
|---|---|---|---|
| 6,753,112 B2 * | 6/2004 | Ooya et al. .................. 429/232 |
| 8,865,349 B2 * | 10/2014 | Okada et al. ................ 429/224 |
| 2002/0127473 A1 | 9/2002 | Ooya et al. | |
| 2008/0081258 A1 | 4/2008 | Kim et al. | |
| 2009/0297952 A1 | 12/2009 | Yasunaga et al. | |
| 2010/0233540 A1 | 9/2010 | Choy et al. | |
| 2012/0156560 A1 | 6/2012 | Hong et al. | |

FOREIGN PATENT DOCUMENTS

| | | |
|---|---|---|
| CA | 2 807 059 | 11/2006 |
| CN | 101573812 A | 11/2009 |
| JP | 2002-134101 A | 5/2002 |
| JP | 2003-109599 A | 4/2003 |
| JP | 2004-39443 A | 2/2004 |
| JP | 2007-103066 A | 4/2007 |
| JP | 2009-272041 A | 11/2009 |
| KR | 10-2008-0083237 A | 9/2008 |
| KR | 10-2010-0004797 A | 1/2010 |
| KR | 10-2010-0044712 A | 4/2010 |
| KR | 10-2010-0044714 A | 4/2010 |
| KR | 10-2010-0131921 A | 12/2010 |

OTHER PUBLICATIONS

International Search Report for PCT/KR2012/001089 mailed on Sep. 26, 2012.

* cited by examiner

*Primary Examiner* — Patrick Ryan
*Assistant Examiner* — Julian Anthony
(74) *Attorney, Agent, or Firm* — Birch, Stewart, Kolasch & Birch, LLP

(57) ABSTRACT

Disclosed is a cathode mix for secondary batteries, comprising lithium iron phosphate, coated with carbon (C), having an olivine crystal structure that contains a compound represented by the following formula 1 as a cathode active material, wherein a mean particle diameter of primary particles in the cathode active material is 2 μm or less, and the cathode mix contains a hydrophilic conductive material as a conductive material.

$$(1-x)Li_{1+a}Fe_{1-y}M_y(PO_{4-z})A_z \cdot xC \qquad (1)$$

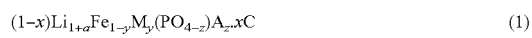

wherein M is at least one selected from Al, Mg, Ni, Co, Mn, Ti, Ga, Cu, V, Nb, Zr, Ce, In, Zn and Y, A is at least one selected from F, S and N, and $0<x\leq 0.2$, $-0.5\leq a\leq +0.5$, $0\leq y\leq 0.5$, $0\leq z\leq 0.1$.

10 Claims, No Drawings

CATHODE MIX FOR SECONDARY BATTERY AND SECONDARY BATTERY COMPRISING THE SAME

CROSS REFERENCE TO RELATED APPLICATIONS

This non-provisional application is a Continuation of International Application No. PCT/KR2012/001089 filed on Feb. 14, 2012, which claims the benefit of Korean Patent Application No. 10-2011-0013074 filed in Korea on Feb. 15, 2011. The entire contents of all of the above applications are hereby incorporated by reference.

TECHNICAL FIELD

The present invention relates to a cathode active material for secondary batteries. More specifically, the present invention relates to a cathode mix for secondary batteries that contains lithium iron phosphate, coated with carbon (C), having an olivine crystal structure, as a cathode active material, wherein a mean particle diameter of primary particles in the cathode active material is 2 μm, and the cathode mix contains a hydrophilic conductive material as a conductive material.

BACKGROUND ART

Carbon materials are generally used as cathode active materials for lithium secondary batteries that are being used in rapidly increasing number. Also, the use of lithium metals, sulfur compounds, silicon compounds, tin compounds and the like have been considered. Meanwhile, lithium-containing cobalt oxides ($LiCoO_2$) are generally used as cathode active materials for lithium secondary batteries. Also, the use of lithium-containing manganese oxides such as $LiMnO_2$ having a layered crystal structure and $LiMn_2O_4$ having a spinel crystal structure, and lithium-containing nickel oxide ($LiNiO_2$) as the cathode active materials has been considered.

$LiCoO_2$ is currently used owing to superior physical properties such as cycle properties, but has disadvantages of low stability, high-cost due to use of cobalt, which suffers from natural resource limitations, and limitation of mass-use as a power source for electric automobiles. $LiNiO_2$ is unsuitable for practical application to mass-production at a reasonable cost due to many features associated with preparation methods thereof. Lithium manganese oxides such as $LiMnO_2$ and $LiMn_2O_4$ have a disadvantage of poor cycle properties.

In recent years, methods to use a lithium transition metal phosphate as a cathode active material have been researched. Lithium transition metal phosphates are largely divided into $Li_xM_2(PO_4)_3$ having a Nasicon structure and $LiMPO_4$ having an olivine structure, and are found to exhibit superior high-temperature stability, as compared to conventional $LiCoO_2$. To date, $Li_3V_2(PO_4)_3$ is the most widely known Nasicon structure compound, and $LiFePO_4$ and $Li(Mn, Fe)PO_4$ are the most widely known olivine structure compounds.

Among olivine structure compounds, $LiFePO_4$ has a high output voltage of 3.5V, a high volume density of 3.6 g/cm$^3$, and a high theoretical capacity of 170 mAh/g, as compared to lithium (Li), and exhibits superior high-temperature stability, as compared to cobalt (Co), and utilizes cheap Fe as an ingredient, thus being highly applicable as a cathode active material for lithium secondary batteries.

However, active materials used for lithium secondary batteries require high density and rate properties. Such $LiFePO_4$ exhibits considerably low Li$^+$ diffusion rate and electrical conductivity. For this reason, when $LiFePO_4$ is used as a cathode active material, internal resistance of batteries disadvantageously increases. As a result, when battery circuits are closed, polarization potential increases, thus decreasing battery capacity.

In order to solve these problems, Japanese Patent Application Publication No. 2001-110414 suggests incorporation of conductive materials into olivine-type metal phosphates in order to improve conductivity.

However, $LiFePO_4$ is commonly prepared using $Li_2CO_3$ or LiOH as a lithium source, by solid state methods, hydrothermal methods and the like. Lithium sources and carbon sources added to improve conductivity disadvantageously cause a great amount of $Li_2CO_3$.

Such $Li_2CO_3$ is degraded during charging, or reacts with an electrolyte solution to produce $CO_2$ gas, thus disadvantageously causing production of a great amount of gases during storage or cycles. As a result, disadvantageously, swelling of batteries is generated and high-temperature stability is deteriorated.

In another approach, a method in which a diffusion distance is decreased by reducing the particle size of $LiFePO_4$ is used. In this case, great costs associated with the process for fabricating batteries are incurred due to high BET value.

Such $LiFePO_4$ has a great advantage of being low cost, but having a lower density than active materials having a generally known layered structure or spinel structure due to the afore-mentioned disadvantages, thus causing a deterioration in content of active materials in the process of mixing to fabricate electrodes.

In particular, when the surface of $LiFePO_4$ is treated with carbon (C), hydrophobic functional groups are present and further deteriorated mixing properties are thus imparted. In addition, as particle size decreases, mixing properties are deteriorated. In order to reinforce these mixing properties, the amount of solvent should be increased. As the amount of solvent increases, cracks are induced in pores formed during evaporation of the solvent in the drying process, and problems such as non-uniformity of electrodes and deterioration in conductivity are caused. Such a mixing problem is encountered in the initial process of battery fabrication, thus having a great effect on all battery processes and battery characteristics.

Accordingly, there is an increasing need for mixes that use $LiFePO_4$ coated with carbon (C) as an active material, do not increase the amount of solvent, exhibit superior process properties and have a high solid content in the slurry.

DISCLOSURE

Technical Problem

Therefore, the present invention has been made to solve the above problems and other technical problems that have yet to be resolved.

As a result of a variety of extensive and intensive studies and experiments to solve the problems as described above, the inventors of the present invention have discovered that, when specific lithium iron phosphate nanoparticles coated with carbon (C) having an olivine crystal structure are used as hydrophilic conductive materials, the amount of solvent can be reduced, the solid content of slurry can thus be increased, and formation of cracks can be reduced in the process of fabricating the electrode. Based on this discovery, the present invention has been completed.

Technical Solution

In accordance with one aspect of the present invention, provided is a cathode mix for secondary batteries, comprising lithium iron phosphate, coated with carbon (C), having an olivine crystal structure that contains a compound represented by the following formula 1 as a cathode active material and, wherein a mean particle diameter of primary particles in the cathode active material is 2 μm or less, contains a hydrophilic conductive material as a conductive material, and has a high solid content in the slurry to be applied to a current collector in the process of fabricating electrodes.

  (1)

wherein M is at least one selected from Al, Mg, Ni, Co, Mn, Ti, Ga, Cu, V, Nb, Zr, Ce, In, Zn and Y, A is at least one selected from F, S and N, and $0<x\leq0.2$, $-0.5\leq a\leq+0.5$, $0\leq y\leq0.5$, $0\leq z\leq0.1$.

Generally, a polar solvent, NMP is used as a solvent for preparation of an electrode mix. On the other hand, the surface of lithium iron phosphate treated with carbon becomes hydrophobic, and acetylene black that is generally used in the conductive material in order to maximize conductivity also becomes hydrophobic, thus causing a deterioration in miscibility with NMP. In particular, such a phenomenon becomes more serious as the particle size of the cathode active material decreases. This property conflicts with the behavior in which battery characteristics improve as the particle size decreases.

However, as described above, when a hydrophilic conductive material is used as a conductive material, the conductive material is well dispersed in the solvent and the amount of solvent can be reduced and miscibility can be improved although lithium iron phosphate having a small particle size is used.

Since conventional lithium transition metal oxides having a layered structure or spinel structure with high density are free of problems associated with process and electrode cracks, when a hydrophilic conductive material is used, disadvantageously, electrical conductivity is decreased and performance of batteries is thus deteriorated.

When the mean particle diameter of primary particles of the cathode active material exceeds 2 μm, since electrical conductivity and ionic conductivity of the afore-mentioned lithium iron phosphate are low, it is difficult to improve performance of batteries when used for batteries.

In addition, since a material not treated with carbon has superior miscibility, it is practically unsuitable for use in batteries due to deteriorated effects of the hydrophilic conductive material and low conductivity.

For these reasons, the mean particle diameter of primary particles of the cathode active material is preferably 50 to 1000 nm. When mean particle diameter of primary particles of the cathode active material is less than 50 nm, problems such as excessively deteriorated processability and difficult preparation disadvantageously occur.

Any hydrophilic conductive material may be used without particular limitation so long as it is hydrophilic and conductive. The hydrophilic conductive material preferably contains a hydrophilic group in an amount not less than 0.1% by weight and lower than 20% by weight. When the content is lower than 0.1% by weight, effects of the hydrophilic group cannot be obtained and when the content is 20% by weight or more, the hydrophilic conductive material is unsuitable for use in batteries due to deteriorated electrical conductivity. For this reason, the hydrophilic conductive material more preferably contains a hydrophilic group in an amount of 0.2% by weight to 5% by weight.

In addition, the hydrophilic conductive material may be obtained by treating the surface of hydrophobic conductive material with a hydrophilic material. Any form of surface-treatment may be used without particular limitation so long as it imparts a hydrophilic group to the surface of the hydrophobic conductive material. For example, oxidation in which an oxygen-containing functional group is incorporated may be used. Such oxidation may be carried out by adopting a method for surface-treating an inorganic material known in the art, if necessary.

In addition, the hydrophilic conductive material is preferably a micro powder structure having a mean particle diameter of 300 nm or less, and lithium iron phosphate has a transfer channel of one-dimensional lithium ions, and is preferably not a carbon fiber that serves as a pore in the electrode and may thus deteriorate electrode capacity due to predetermined sizes, that is, diameter and length.

Furthermore, a great amount of NMP should be incorporated due to structural properties of carbon fibers in order to improve dispersability, thus causing a deterioration in processability. This is also applied to hydrophilic surface-treatment.

In addition, since carbon fiber is a conductive material that is much more expensive than generally used carbon materials, it has limitations in use for mass-production as a conductive material although it can be academically or experimentally used as a conductive material.

When the mean particle diameter exceeds 300 nm, disadvantageously, the content of the conductive material increases and the overall battery capacity may decrease.

In a preferred embodiment, the content of the solid in the slurry may be 70% or more and a maximum content may be 95%.

The method for preparing lithium iron phosphate with an olivine crystal structure is not limited and examples thereof include a solid phase method, a coprecipitation method, a hydrothermal method, a supercritical hydrothermal method and the like.

The cathode mixture may further optionally comprise a binder, a filler and the like, in addition to the cathode active material and the hydrophilic conductive material.

The binder is a component which enhances binding of an electrode active material to a conductive material and current collector. The binder is commonly added in an amount of 1 to 30% by weight, based on the total weight of the mixture comprising the cathode active material. Examples of the binder include polyvinylidene, polyvinyl alcohol, carboxymethylcellulose (CMC), starch, hydroxypropylcellulose, regenerated cellulose, polyvinyl pyrrolidone, tetrafluoroethylene, polyethylene, polypropylene, ethylene propylene diene terpolymer (EPDM), sulfonated EPDM, styrene butadiene rubbers, fluororubbers and various copolymers.

The filler is a component optionally used to inhibit expansion of the electrode. Any filler may be used without particular limitation so long as it does not cause adverse chemical changes in the manufactured battery and is a fibrous material. Examples of the filler include olefin polymers such as polyethylene and polypropylene; and fibrous materials such as glass fibers and carbon fibers.

The present invention provides a cathode for secondary batteries wherein the cathode mix is applied to a collector.

The cathode for secondary batteries may be prepared by applying a slurry obtained by mixing the cathode mix with a solvent such as NMP to a cathode current collector, followed by drying and press-rolling.

The cathode current collector is generally fabricated to have a thickness of 3 to 500 μm. There is no particular limit as to the cathode current collector, so long as it has suitable conductivity without causing adverse chemical changes in the fabricated battery. Examples of the cathode current collector include stainless steel, aluminum, nickel, titanium, sintered carbon, and aluminum or stainless steel which has been surface-treated with carbon, nickel, titanium or silver. If necessary, these current collectors may also be processed to form fine irregularities on the surface thereof so as to enhance adhesive strength to the cathode active materials. In addition, the current collectors may be used in various forms including films, sheets, foils, nets, porous structures, foams and non-woven fabrics.

The present invention provides a lithium secondary battery comprising the cathode, the anode, a separator, and a lithium salt-containing non-aqueous electrolyte.

For example, the anode is prepared by applying an anode mix comprising an anode active material to an anode current collector, followed by drying. The anode mix may comprise the afore-mentioned ingredients, i.e., the conductive material, the binder and the filler, if necessary.

The anode current collector is generally fabricated to have a thickness of 3 to 500 μm. There is no particular limit as to the anode current collector, so long as it has suitable conductivity without causing adverse chemical changes in the fabricated battery. Examples of the anode current collector include copper, stainless steel, aluminum, nickel, titanium, sintered carbon, and copper or stainless steel which has been surface-treated with carbon, nickel, titanium or silver, and aluminum-cadmium alloys. Similar to the cathode current collector, if necessary, these current collectors may also be processed to form fine irregularities on the surface thereof so as to enhance adhesive strength to the anode active materials. In addition, the current collectors may be used in various forms including films, sheets, foils, nets, porous structures, foams and non-woven fabrics.

Examples of the anode active material include carbon and graphite materials such as natural graphite, artificial graphite, expanded graphite, carbon fiber, hard carbon, carbon black, carbon nanotubes, perylene, activated carbon; metals alloyable with lithium, such as Al, Si, Sn, Ag, Bi, Mg, Zn, In, Ge, Pb, Pd, Pt and Ti and compounds containing these elements; composites of carbon and graphite materials with a metal and a compound thereof; and lithium-containing nitrides. Of these, a carbon-based active material, a silicon-based active material, a tin-based active material, or a silicon-carbon-based active material is more preferred. The material may be used alone or in combination of two or more thereof.

The separator is interposed between the cathode and anode. As the separator, an insulating thin film having high ion permeability and mechanical strength is used. The separator typically has a pore diameter of 0.01 to 10 μm and a thickness of 5 to 300 μm. As the separator, sheets or non-woven fabrics made of an olefin polymer such as polypropylene and/or glass fibers or polyethylene, which have chemical resistance and hydrophobicity, are used. When a solid electrolyte such as a polymer is employed as the electrolyte, the solid electrolyte may also serve as both the separator and electrolyte.

The lithium salt-containing, non-aqueous electrolyte is composed of a non-aqueous electrolyte and a lithium salt. As the non-aqueous electrolyte, a non-aqueous electrolyte solution, solid electrolyte and inorganic solid electrolyte may be utilized.

Examples of the non-aqueous electrolyte solution that can be used in the present invention include non-protic organic solvents such as N-methyl-2-pyrollidinone, propylene carbonate, ethylene carbonate, butylene carbonate, dimethyl carbonate, diethyl carbonate, gamma-butyrolactone, 1,2-dimethoxy ethane, tetrahydroxy Franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate and ethyl propionate.

Examples of the organic solid electrolyte utilized in the present invention include polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

Examples of the inorganic solid electrolyte include nitrides, halides and sulfates of lithium such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$ and $Li_3PO_4$—$Li_2S$—$SiS_2$.

The lithium salt is a material that is readily soluble in the above-mentioned non-aqueous electrolyte and examples thereof include $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate and imides.

Additionally, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the non-aqueous electrolyte. If necessary, in order to impart incombustibility, the non-aqueous electrolyte may further contain halogen-containing solvents such as carbon tetrachloride and ethylene trifluoride. Further, in order to improve high-temperature storage characteristics, the non-aqueous electrolyte may further contain carbon dioxide gas or the like and further comprise fluoro-ethylene carbonate (FEC), propene sultone (PRS) and the like.

The lithium secondary batteries according to the present invention may be fabricated by a common method known in the art. In addition, in the lithium secondary batteries according to the present invention, the structures of cathode, anode and separator are not particularly limited and, for example, the lithium secondary batteries have a structure in which respective sheets are inserted into a cylindrical, rectangular or pouch case in a winding or stacking manner.

The secondary battery has a 2.0 C/0.1 C discharge capacity ratio of 90% or more, thus exhibiting superior output, and has a $50^{th}/1^{st}$ discharge capacity of 95% or more under 1 C charge and discharge conditions, thus exhibiting superior cycle properties.

The present invention provides medium and large battery packs comprising the lithium secondary batteries as unit batteries.

The battery packs may be used for various middle and large devices requiring high rate properties and high-temperature stability and examples thereof include power tools powered by battery-driven motors; electric vehicles including electric vehicles (EVs), hybrid electric vehicles (HEVs) and plug-in hybrid electric vehicles (PHEVs); electric two-wheeled vehicles including electric bikes (E-bikes), electric scooters (E-scooters); electric golf carts and the like.

BEST MODE

Now, the present invention will be described in more detail with reference to the following examples. These examples are provided only to illustrate the present invention and should not be construed as limiting the scope and spirit of the present invention.

An active material ($0.98LiFePO_4 \cdot 0.02C$), a hydrophilic conductive material and a binder were weighed at a ratio of 90:6:4, the mixture was mixed with NMP to prepare a cathode mix, the mix was coated on an aluminum foil to a thickness of 20 μm, and the foil was pressed and dried to fabricate an electrode. The hydrophilic conductive material was a material in which the amount of the hydrophilic group in the conductive material was 1% by weight.

Comparative Example 1

An electrode was fabricated in the same manner as in Example 1 except that acetylene black was used as a conductive material.

Example 2

An electrode was fabricated in the same manner as in Example 1 except that the cathode mix was coated on a current collector to a thickness of 300 μm.

Example 3

An electrode was fabricated in the same manner as in Example 1 except that the cathode mix was coated on a current collector to a thickness of 350 μm.

Example 4

An electrode was fabricated in the same manner as in Example 1 except that the cathode mix was coated on a current collector to a thickness of 400 μm.

Comparative Example 2

An electrode was fabricated in the same manner as in Comparative Example 1 except that the cathode mix was coated on a current collector to a thickness of 300 μm.

Comparative Example 3

An electrode was fabricated in the same manner as in Comparative Example 1 except that the cathode mix was coated on a current collector to a thickness of 350 μm.

Comparative Example 4

An electrode was fabricated in the same manner as in Comparative Example 1 except that the cathode mix was coated on a current collector to a thickness of 400 μm.

Test Example 1

In order to compare the amount of solid in the process for fabricating electrodes, the amount of used NMP was normalized and the results are shown in the following Table 1. For comparison, electrodes were fabricated in the same manner as in Comparative Example 1 using $LiMn_2O_4$ and $LiNi_{1/3}Mn_{1/3}Co_{1/3}O_2$ as active materials and were tested. The results are shown in the following Table 1.

TABLE 1

| | Amount of used Normalized NMP (%) |
|---|---|
| Slurry of Example | 64 |
| Slurry of Comparative Example | 100 |
| Reference ($LiMn_2O_4$) | 80 |
| Reference ($LiNi_{1/3}Mn_{1/3}Co_{1/3}O_2$) | 67 |

As can be seen from Table 1, the slurries of Examples exhibited an about 30% decrease in used NMP amount, as compared to slurries of Comparative Examples. This means that the process can be improved to about 30% or more. In addition, the slurries have a high solid content, as compared to solid contents of commonly used cathode active materials, thus exhibiting superior processability.

Test Example 2

The electrodes of Examples 1 to 4 and Comparative Examples 1 to 4 were pressed in the form of a coin and a coin-type battery was fabricated using Li metal as an anode and a carbonate electrolyte solution, in which one mole of $LiPF_6$ was dissolved, as an electrolyte solution.

The obtained battery was subjected to 0.1 C charge and discharge (twice), 0.5 C charge and discharge (twice), 1.0 C charge and discharge (twice), 2.0 C charge and discharge (twice) and then 1 C charge and discharge.

2.0 C/0.1 C discharge capacity ratio (rate property) measured in the test and $50^{th}/1^{st}$ discharge capacity ratio upon 1 C charge and discharge (cycle property) are shown in the following Table 2.

TABLE 2

| | Rate capability (2.0 C./0.1 C., %) | Cycle property ($50^{th}/1^{st}$, %) |
|---|---|---|
| Example 1 | 95.2 | 99.3 |
| Comparative Example 1 | 93.1 | 96.5 |
| Example 2 | 94.3 | 98.8 |
| Example 3 | 92.7 | 97.5 |
| Example 4 | 90.6 | 97.7 |
| Comparative Example 2 | 90.2 | 94.2 |
| Comparative Example 3 | 86.3 | 92.6 |
| Comparative Example 4 | 82.6 | 89.5 |

As can be seen from Table 2, the battery in which the electrode of Example is used exhibited superior electrochemical properties. In particular, as electrode thickness increases, the effect is remarkable. The reason for this is that electrode cracks become more serious since a greater amount of solvent should be evaporated as the thickness increases. In the secondary battery, electrode thickness is a considerably important element that improves capacity of batteries and has a great effect on applicability of a specific active material.

From these results, although it may be thought that there is no great difference in cycle properties, when taking into consideration the fact that the battery will be used generally for vehicles and power storage batteries that should be used 2,000 to 5,000 times or more, difference in cycle properties will further increase.

INDUSTRIAL APPLICABILITY

As apparent from the fore-going, the cathode mix for secondary batteries according to the present invention can reduce a solvent content, thus advantageously exhibiting a high solid content in the slurry, minimizing cracks in the process of fabricating electrodes, and improving processability.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A cathode mix for secondary batteries having a cathode active material, a conductive material and a binder, wherein the cathode active material, comprising lithium iron phosphate, coated with carbon (C), having an olivine crystal structure that contains a compound represented by the following formula 1, wherein a mean particle diameter of primary particles in the cathode active material is 50 to 1000 nm, the conductive material contains a hydrophilic conductive material, and the hydrophilic conductive material has a hydrophilic functional group content not less than 0.1% by weight and lower than 20% by weight:

$$(1-x)Li_{i+a}Fe_{1-y}M_y(PO_{4-z})A_z \cdot xC \quad (1)$$

wherein

M is at least one selected from Al, Mg, Ni, Co, Mn, Ti, Ga, Cu, V, Nb, Zr, Ce, In, Zn and Y;

A is at least one selected from F, S and N; and $0<x\leq0.2$, $-0.5\leq a\leq+0.5$, $0\leq y\leq0.5$, $0\leq z\leq0.1$.

2. The cathode mix for secondary batteries according to claim 1, wherein the hydrophilic conductive material has a hydrophilic functional group content not less than 0.2% by weight and lower than 5% by weight.

3. The cathode mix for secondary batteries according to claim 1, wherein the hydrophilic conductive material has a mean particle diameter of 300 nm or less.

4. A cathode for secondary batteries in which the cathode mix for secondary batteries according to claim 1 is applied to a current collector.

5. A lithium secondary battery comprising the cathode for secondary batteries according to claim 4.

6. The lithium secondary battery according to claim 5, wherein the secondary battery has a 2.0 C/0.1 C discharge capacity ratio of 90% or more and 50th/1st cycle discharge capacity under 1 C charge and discharge conditions of 95% or more.

7. A battery module comprising the lithium secondary battery according to claim 5 as a unit battery.

8. A battery pack comprising the battery module according to claim 7 as a unit battery.

9. The battery pack according to claim 8, wherein the battery pack is used as a power source of medium and large devices.

10. The battery pack according to claim 9, wherein the medium and large devices are electric vehicles (EVs), hybrid electric vehicles (HEVs), plug-in hybrid electric vehicles (PHEVs) or power storage systems.

* * * * *